(12) United States Patent
Becker et al.

(10) Patent No.: US 7,258,847 B2
(45) Date of Patent: Aug. 21, 2007

(54) RECOVERY OF TITANIUM FROM TITANIUM BEARING MATERIALS

(75) Inventors: Jan Hendrik Becker, Pretoria (ZA); Daniel Frederick Dutton, Witbank (ZA)

(73) Assignees: Highveld Steel and Vanadium Corporation Limited, Witbank (ZA); Rossmali Technology Holdings (Pty) Ltd, Constantia Park (ZA)

( * ) Notice: Subject to any disclaimer, the term of this patent is extended or adjusted under 35 U.S.C. 154(b) by 330 days.

(21) Appl. No.: 10/484,240

(22) PCT Filed: Jul. 16, 2002

(86) PCT No.: PCT/IB02/02768

§ 371 (c)(1),
(2), (4) Date: Jul. 7, 2004

(87) PCT Pub. No.: WO03/008335

PCT Pub. Date: Jan. 30, 2003

(65) Prior Publication Data

US 2004/0237719 A1    Dec. 2, 2004

(30) Foreign Application Priority Data

Jul. 16, 2001    (ZA)    ................. 2001/5826

(51) Int. Cl.
*C01G 23/047*    (2006.01)

(52) U.S. Cl. .......... 423/82; 423/610; 423/114
(58) Field of Classification Search .......... 423/82, 423/610, 114
See application file for complete search history.

(56) References Cited

U.S. PATENT DOCUMENTS 2,837,426 A * 6/1958 Kamlet ............... 420/418

FOREIGN PATENT DOCUMENTS

| GB | 2 109 356 | 6/1983 |
|---|---|---|
| WO | 96/10096 | 4/1996 |

OTHER PUBLICATIONS

Abstract of SU 1490127, Jun. 30, 1989.*

* cited by examiner

*Primary Examiner*—Steven Bos
(74) *Attorney, Agent, or Firm*—Pauley Petersen & Erickson

(57) ABSTRACT

A method of recovering titanium dioxide from a raw material additionally containing aluminium includes the steps of grinding the titanium dioxide raw material, reacting the particulate raw feed material with sulphuric acid under specified conditions, digesting and filtering the resultant cake material containing titanyl sulphate, if present, treating the solution to remove calcium and/or iron, precipitating out the aluminium as aluminium ammonium sulphate, hydrolysing the remaining titanyl sulphate solution and, after washing the hydrolysate, calcining the hydrolysate to produce titanium dioxide.

12 Claims, 1 Drawing Sheet

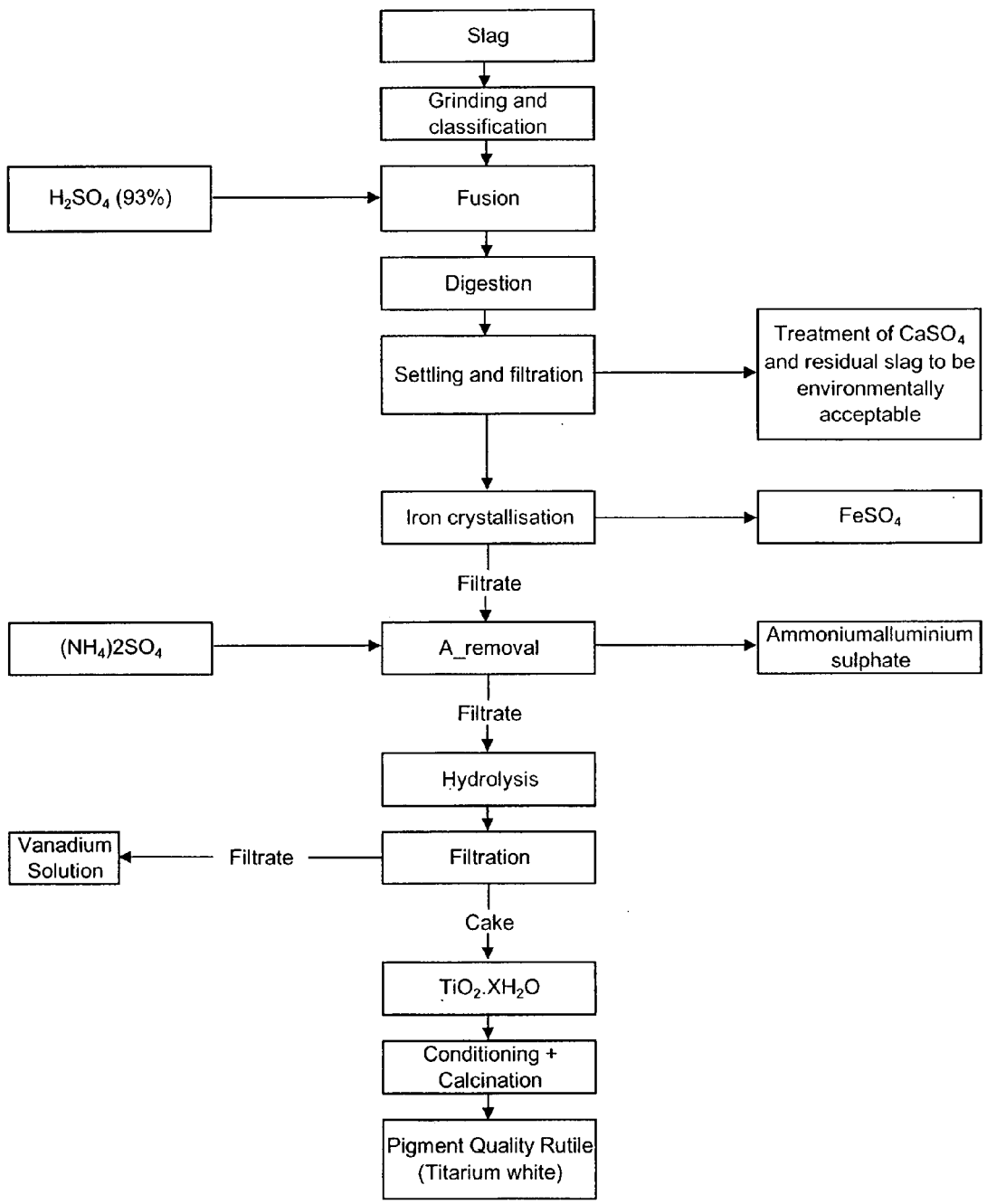

RECOVERY OF TITANIUM FROM TITANIUM BEARING MATERIALS

BACKGROUND OF THE INVENTION

THIS invention relates to the recovery of titanium from titanium bearing materials, and in particular to a method of recovering titanium dioxide or titanium metal from a titanium dioxide bearing material.

Highveld Steel and Vanadium Corporation is a large manufacturer of steel using its own unique steel manufacturing process. The slag produced in this steel manufacturing process is rich in titanium dioxide, typically in amounts of 22 to 32% of the slag material.

Pure titanium dioxide is white in colour and is, therefore, a valuable pigment used in many applications such as the production of paints, paper, cement, polymers and the like. The slag produced in the Highveld Steel manufacturing process is an ideal source of titanium dioxide for this purpose.

SUMMARY OF THE INVENTION

A method of recovering titanium dioxide from a raw material containing the titanium dioxide and aluminium, typically as its oxide, comprises the steps of:
  a) grinding the titanium dioxide bearing material to form a particulate raw feed material;
  b) contacting the particulate raw feed material with a predetermined amount of sulphuric acid in a reaction vessel and raising the temperature in the reaction vessel to a predetermined temperature at which a reaction takes place to produce a cake material containing titanyl sulphate;
  c) contacting the cake material with a sufficient quantity of water, and optionally recovered process acid, to dissolve the cake material, which contains the titanyl sulphate;
  d) filtering the resultant suspension and collecting the solution containing the titanyl sulphate and, if present, optionally treating the solution to remove iron and/or calcium;
  e) contacting the titanyl sulphate containing solution with ammonium sulphate to produce aluminium ammonium sulphate in the solution;
  f) precipitating the aluminium ammonium sulphate out of the solution and separating it from the titanyl sulphate containing solution;
  g) hydrolysing the titanyl sulphate containing solution by contacting the solution with water, which has first been seeded with an appropriate amount of rutile and heated, or a portion of previously hydrolysed solution containing hydrated titanium dioxide, and heating the solution to boiling point to precipitate out hydrated titanium dioxide;
  h) washing the hydrolysate with an ammonium solution to remove residual sulphates as ammonium sulphates followed by filtering off the hydrated titanium dioxide; or
  i) filtering the hydrolysate followed by washing with sodium hydroxide, ammonium hydroxide, water, phosphoric acid and/or diluted sulphuric acid; and
  j) calcining the hydrolysate to drive off any residual acid and water of crystallisation to produce titanium dioxide.

The raw material typically also contains vanadium, calcium and/or iron typically as their oxides.

The vanadium is typically removed as $VOSO_4$ in the solution remaining in step g).

In this regard, the $Ti^{3+}$ (as $TiO_2$) in the hydrolytic solution is preferably kept at a concentration of 3 to 4 g/l $Ti^{3+}$ to prevent hydrolysis of the $VOSO_4$ and incorporation into the hydrated $TiO_2$ product.

The insoluble solid residue produced in step c) is preferably separated from the solution by clarification, typically with the addition of gellatene and/or glue, dextrine, tannic acid, or other appropriate clarifier, before the suspension is filtered in step d).

The hydrolysis step g) is preferably carried out in the absence of a prior crystallisation and vacuum concentration step having taken place.

The cake material of step b) is preferably left to mature for about 2 to 3 hours at a temperature of about 190° C. to 250° C. before being dissolved in step c).

In step c), air is preferably introduced with the water, and optionally recovered process acid, in order to assist with agitation to dissolve the cake.

The air is preferably cold air to control the reaction temperature below about 75° C., typically 70 to 75° C., in order to prevent premature crystallisation of $TiO_2$.

The slag in step a) is preferably ground to form a particulate material in which at least 80% of the particles are able to pass through a 45 micron mesh.

The reaction of the sulphuric acid solution and particulate feed material in step b) typically takes place in a fusion reactor, which may be a batch or continuous fusion reactor.

The temperature is preferably raised in the fusion reactor by introducing pre-heated air into the reaction vessel.

After the desired amount of water has been introduced, air and mechanical agitation is used to break the cake into a homogenous suspension.

The calcium is typically removed as calcium sulphate, typically during the filtration step d).

BRIEF DESCRIPTION OF THE DRAWING

The invention will now be described in more detail, by way of example only, with reference to the accompanying drawing, which is a schematic flow diagram of a preferred embodiment of a method of recovering titanium dioxide according to the present invention.

DETAILED DESCRIPTION OF A PREFERRED EMBODIMENT

The present invention is directed at a so-called sulphating process for recovering titanium, in particular titanium dioxide, from a titanium bearing material, in particular a slag produced in a steel manufacturing process containing titanium dioxide and aluminium, and typically also vanadium, calcium, and/or iron, typically as their oxides.

The process of the invention, as set out in the accompanying drawing, is particularly suited for recovering $TiO_2$ from a slag as set out below.

| | |
|---|---|
| Total $TiO_2$ | 24-30% |
| FeO | 2-8% |
| $Fe_2O_3$ | 2-8% |
| CaO | 14-16% |
| MgO | 12-15% |
| $SiO_2$ | 20-25% |
| $Al_2O_3$ | 12-14% |
| $V_2O_5$ | 0.2-1% |

-continued

| | |
|---|---|
| MnO | 0.2-1% |
| S | 0.01-0.2% |
| Na$_2$O | 0-0.2% |
| P$_2$O$_5$ | 0.01% |
| H$_2$O | 0.06% |

The titanium slag (elkem slag) available is dried as needed and ground to a uniform fin particle size of less than 45 μm. The pulverized slag is mixed with approximately 1.3 parts by weight of 93% to 98% sulfuric acid and stirred with compressed air in a reactor vessel. The mixture is heated with pre-heated air in the reactor vessel. At about 100° C. the exothermic reaction starts, increasing rapidly when the temperature reaches 180° C., and the slag is converted into a solid mass composed of soluble titanium, aluminum, vanadium and iron sulphates. The use of heated air instead of steam has been found preferable. The reason for this is that the Highveld Steel slag used in the process has free iron present, in an amount of about 4%, in the ferrous state. Accordingly, it is undesirable to have water in the fusion reaction as it would transform the free iron to the Fe$^{3+}$ state. In addition, the presence of oxygen in the heated air assists in the recovery of the titanium by converting Ti$^{3+}$ to Ti$^{4+}$.

Cold air is then blown through the cake for about 4 hours after the reaction is completed to produce a porous cake. The cake so produced is left to mature at a temperature of about 190 to 250° C. for about 2 to 3 hours.

The reaction cake is then digested in water, and optionally recovered process acid, in a ratio of water to solid of about 3:1 in order to dissolve the desired titanium compounds. During the introduction of water, air is introduced simultaneously to assist with agitation, as mechanical agitation would not at this stage be effective due to the solid cake formed. During the introduction of air and water an exothermic reaction takes place. As it is important for the reaction temperature to be controlled below 75° C., in order to avoid premature crystallisation of the TiO$_2$, proper flow control of the cold air into the reactor vessel is maintained. After the desired amount of water has been introduced, air and mechanical agitation is used to break the cake into a homogeneous suspension. The appropriate time to achieve the suspension is in the order of 4 hours, but visible inspection will indicate when this has been achieved.

Some of the titanium compounds which are believed to go into solution when digesting the cake with water include:

TiO$_2$.xH$_2$O

TiOSO$_4$.H$_2$O

TiOSO$_4$.2H$_2$O

TiSO$_4$.H$_2$SO$_4$.2H$_2$O

TiSO$_4$.H$_2$SO$_4$.H$_2$O

Ti(SO$_4$)$_2$.

Where ilmenite is used as a raw material, the solution typically contains trivalent or "ferric" iron. This is reduced to the divalent or "ferrous" form with scrap iron as reducing agent. This step is not required in the case of the Highveld Steel slag as the iron in the slag is already in the "ferrous" state.

Following leaching the insoluble solid residue is separated from the resulting solution by clarification. The elkem slag contains impurities, some of which easily form colloidal solutions, such as SiO$_2$ and Al$_2$O$_3$. Most of the hydrated silica is destroyed under the high reaction temperature. The insoluble solids can easily be separated from the leaching solution by clarification with the addition of gellatene and/or glue, dextrine and tannic acid. AMPAM clarificant solution can also be used.

The suspension so obtained is filtered through a filter system, typically using large settling tanks. The filtrate consists mainly of calcium sulphate CaSO$_4$ and residue. The residue is then washed with water for disposal. Alternatively, the CaSO$_4$ residue can be treated to recover H$_2$SO$_4$.

A very dense yellow solution is obtained after filtering, which is rich in peroxide TiO$_3$.2H$_2$O. By way of information, the peroxide is an oxidizing substance which is unstable in the presence of water and is much more soluble than TiO$_2$ or TiO$_2$.H$_2$O. It dissolves in acid solutions with the formation of yellow to red pertitanyl ions (TiO$_2$$^{2+}$). In alkaline solutions, it forms titanate ions (HTiO$_3$$^-$) and/or colourless pertitanate ions (HTiO$_4$$^-$ and TiO$_4$$^-$). The solubility of the peroxide is around 1 g.mol/l at a pH of 0.5 (acid medium) and at a pH of 12 (alkaline medium). By the action of hydrogen peroxide on very acid solutions of tri- or tetravalent titanium, a solution of peroxidized TiO$_2$$^{2+}$ ions is obtained, which deposits as a precipitate of peroxide, TiO$_3$.2H$_2$O, upon increasing the pH.

The clarified titanyl sulphate solution contains approximately 100 gpl TiO$_2$ and 15 gpl Al$_2$(SO$_1$)$_3$.

If the solution is concentrated to about 200 gpl TiO$_2$, the aluminium sulphate will be precipitated as a crystalline solid at room temperature, and the solution will become an "unflowed solid". Therefore the aluminium sulphate must be removed from the clarified solution before concentration. The ammonium sulphate is added to the solution, which then reacts with the aluminium sulphate in it as follows:

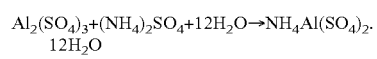
Al$_2$(SO$_4$)$_3$+(NH$_4$)$_2$SO$_4$+12H$_2$O→NH$_4$Al(SO$_4$)$_2$.12H$_2$O After reaction, the aluminium ammonium sulphate is precipitated in crystalline solid form and separated from the solution.

The solution is then filtered to remove traces of insoluble materials

During the hydrolysis step, the titanium solution is transformed into a white titanium oxyhydrate slurry. The steps that have gone before are fundamental in preparing the titanium compounds for hydrolysis. One step which is not required when using Highveld slag is crystallization and vacuum concentration. Thus, hydrolysis is carried out by contacting the titanyl sulphate containing solution with heated water which has been seeded with nucleating or seeding agents, in particular nuclei rutile, and then boiled.

The formation of titanyl hydroxide proceeds according to the following reactions:

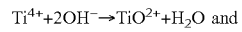
Ti$^{4+}$+2OH$^-$→TiO$^{2+}$+H$_2$O and

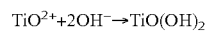
TiO$^{2+}$+2OH$^-$→TiO(OH)$_2$

To increase the rate of thermal hydrolysis of sulphate solutions at atmospheric pressure and at the same time obtain products of pigment grade, nucleating or seeding agents are added. Normally only 1% of nuclei or seed agent is required.

The composition, purity, and physical properties of hydrolytically precipitated titanium dioxide depend to a large extent upon the conditions under which the decomposition takes place, such as composition of the solution employed, temperature, and duration of boiling. In the commonly employed processes, large changes in the concentration of the solution would take place as the hydrolysate is formed and an equivalent amount of acid is liberated. Thus the formation of titanic acid will take place under entirely different conditions at the beginning and at the end of the operation.

To overcome this effect, a titanium-rich solution is prepared from the slag, transferred into a precipitation vessel and heated until practically complete hydrolysis has taken place. Four fifths of the liquor is then removed. To the remaining one fifth, still at the precipitation temperature, fresh pregnant solution is added at such a rate as to secure a practically constant concentration of dissolved titanium until the vessel is filled. Heating is continued throughout the process. The supply of solution is then interrupted, and four fifths of the liquor is again removed. The operation is repeated as often as is necessary. The above process only requires initial introduction of nuclei or seeding agents, thereafter the one fifth liquor contains enough nuclei seeding agents to initiate the hydrolysis reaction. The total cycle time of the exercise is between 3 and 6 hours.

The titanyl sulphate solution treated in the above hydrolysis step contains about 1% $V_2O_5$ and the weight ratio of vanadium to titanium (as $V_2O_5/TiO_2$) is about 1%. The behavior of titanyl sulphate and vanadium sulphate are different. If the pH value of the solution is about 3, the vanadium sulphate will be hydrolyzed. However, if the hydrolytic solution has about 3 to 4 gpl $Ti^{3+}$ (as $TiO_2$) and about 20% of free sulphuric acid, the vanadium sulphate does not hydrolyse.

Test results of hydrolysis showed that about 65% of the vanadium in the hydrolytic solution remained in the mother solution, the remainder being precipitated with the hydrated $TiO_2$. During the washing process, the pH value of the washing water increases. The vanadium sulphate absorbed into the surface of hydrated $TiO_2$ will be hydrolyzed and incorporated into the hydrated $TiO_2$. In order to prevent vanadium from going into the product, the $Ti^{3+}$ content of the hydrolytic solution is controlled between 3 to 4 gpl (as $TiO_2$).

The $TiO_2.xH_2O$ is removed by means of filtering through a filtering system. The hydrolysate is then washed with either sodium hydroxide, ammonium hydroxide, water, phosphoric acid or dilute sulphuric acid to improve the properties of the titanium white.

The vanadium solution can be heated with a 25% $NH_3$ solution, crystallised and filtered to recover the vanadium and $(NH_4)_2SO_4$.

The main reason for washing the hydrolysate is to neutralize the liquor and to improve the crystal properties. Conditioning agents such as dilute acids and zinc or aluminium powder or a powerful non-metallic reducing agent or phosphoric acid or an alkaline metal could also be introduced during this washing stage, to ensure the formation of the rutile structure during the calcination process that follows.

The thoroughly purified and washed hydrolysate obtained by the thermal hydrolysis of titanium salt solutions is an amorphous hydrous oxide which still contains impurities as chemi-adsorbed acid. In addition, it is too fine-grained and almost amorphous, which is undesirable for pigment grade $TiO_2$. In the production of pigment grade $TiO_2$, accordingly, a calcination step is necessary to drive off the water and residual acid and at the same time convert the titanium dioxide to the crystalline form of a required particle size. At the same time, desired pigmentary properties are developed.

Amorphous titanic oxide or hydroxide ($TiO.xH_2O.SO_3$), such as is obtained from the sulphate solution, is converted to the crypto crystalline modification of pigment grade $TiO_2$ by calcination at 950° C. for 1 hour.

The calcined $TiO_2$ is finally ground to 325 mesh powder having a purity of greater than 99.9%.

The invention claimed is:

1. A method of recovering titanium dioxide from a raw material containing the titanium dioxide and aluminium, comprises the steps of:
    a) grinding the titanium dioxide bearing material to form a particulate raw feed material;
    b) contacting the particulate raw feed material with a predetermined amount of sulphuric acid in a reaction vessel and raising the temperature in the reaction vessel to a predetermined temperature at which a reaction takes place to produce a cake material containing titanyl sulphate;
    c) contacting the cake material with a quantity of water, recovered sulphuric acid or a combination thereof, to dissolve the cake material and form a suspension which contains titanyl sulphate;
    d) filtering the suspension and collecting the solution containing the titanyl sulphate and, if present, optionally treating the solution to remove iron and/or calcium;
    e) contacting the titanyl sulphate containing solution from step d) with ammonium sulphate to produce aluminium ammonium sulphate;
    f) precipitating and separating the aluminium ammonium sulphate out of the titanyl sulphate containing solution from step e);
    g) hydrolysing the titanyl sulphate containing solution from step f) by contacting the solution from step f) with one of heated, rutile-seeded water or a portion of a previously hydrolysed solution containing hydrated titanium dioxide to form a hydrolytic solution and heating the hydrolytic solution to boiling point to precipitate out hydrated titanium dioxide;
    h) treating the hydrolysate from step g) by one of washing the hydrolysate from step g) with an ammonium solution to remove residual sulphates as ammonium sulphate followed by filtering the hydrated titanium dioxide, or filtering the hydrolysate from step g) followed by washing with sodium hydroxide, ammonium hydroxide, water, phosphoric acid and/or diluted sulphuric acid; and
    i) calcining the hydrolysate from step h) to drive off any residual acid and water of crystallisation to produce titanium dioxide.

2. A method according to claim 1, wherein the raw material contains iron, calcium, or a combination thereof which is removed from the titanyl sulphate solution in step d).

3. A method according to claim 1 or claim 2, wherein the raw material contains vanadium, which is removed as $VOSO_4$ in the solution remaining in step g).

4. A method according to claim 3, wherein the $Ti^{3+}$ (as $TiO_2$) in the hydrolytic solution is kept at a concentration of 3 to 4 g/l $Ti^{3+}$ to prevent hydrolysis of the $VOSO_4$ and incorporation into the hydrated $TiO_2$ product.

5. A method according to claim 3, wherein the aluminium and the vanadium, calcium and iron, when present, are present as their oxides.

6. A method according to claim 1, wherein the suspension produced in step c) further contains insoluble solid residue which is separated from the suspension by clarification, before the suspension is filtered in step d).

7. A method according to claim 6, wherein the clarification step is carried out with the addition of gellatene, glue, dextrine, tannic acid, or a combination thereof.

8. A method according to claim 1, wherein the hydrolysis step g) is carried out in the absence of a prior crystallisation and vacuum concentration step having taken place.

9. A method according to claim 1, wherein the cake material of step b) is left to mature for about 2 to 3 hours at a temperature of about 190° C. to 250° C. before being dissolved in step c).

10. A method according to claim 1, wherein in step c), air is introduced with the water, recovered sulphuric acid, or a combination thereof in order to assist with agitation to dissolve the cake.

11. A method according to claim 10, wherein the air is cold air to control the reaction temperature below about 75° C., in order to prevent premature crystallisation of $TiO_2$.

12. A method according to claim 11, wherein the reaction temperature is controlled between 70 and 75° C.

* * * * *